Figure 1:
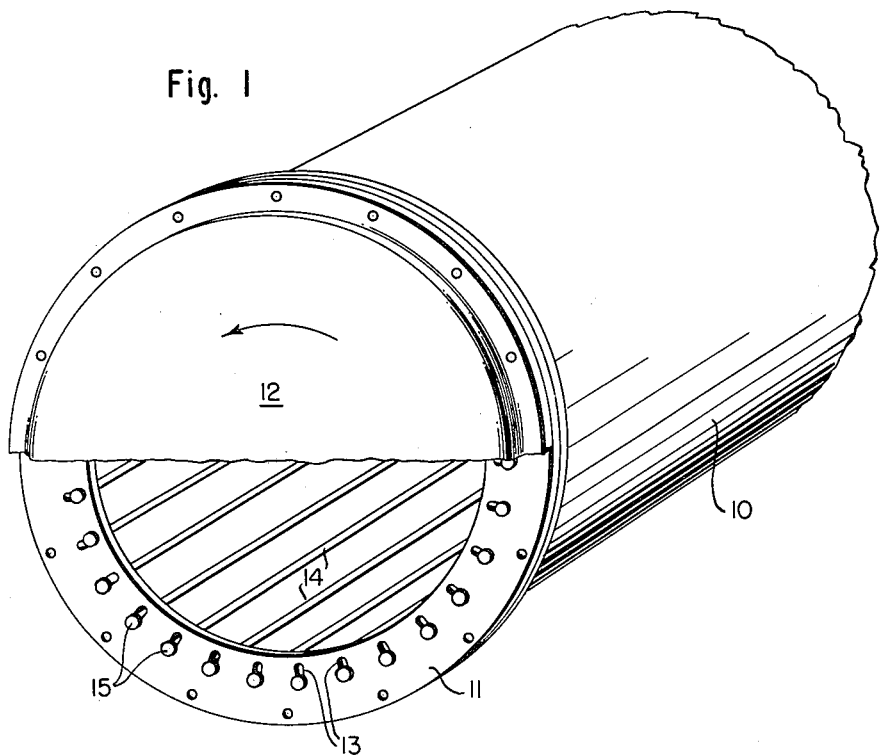

July 24, 1956

O. HERR 2,755,502

APPARATUS FOR GRANULATING CARBON BLACK
AND OTHER FINELY DIVIDED SOLIDS

Filed March 12, 1953

2 Sheets-Sheet 1

INVENTOR.
Oskar Herr
BY
Kenway, Jenney, Witter & Hildreth.
Att'ys.

United States Patent Office 2,755,502
Patented July 24, 1956

2,755,502

APPARATUS FOR GRANULATING CARBON BLACK AND OTHER FINELY DIVIDED SOLIDS

Oskar Herr, Efferen, near Koln, Germany, assignor to Deutsche Gold- und Silber-Scheideanstalt vormals Roessler, Frankfurt am Main, Germany, a corporation Application March 12, 1953, Serial No. 341,996

Claims priority, application Germany March 14, 1952

7 Claims. (Cl. 18—1)

This invention comprises new and improved apparatus for granulating or pelletizing carbon black and other finely divided solids.

Industry is frequently confronted with the problem of converting pulverized and other finely divided solids into a pelletized or granular form for various purposes. For example, mixed fertilizers are known to be preferably marketed in granular form, as this renders them more suitable for spreading manually or by machine. Many pharmaceutical preparations that are used in the form of tablets can be tableted only when previously granulated. Again, other materials are granulated because, in their original finely divided form, they possess undesirable properties such as strong tendency to dust formation or adhesion, which interferes considerably with the handling of such materials, as in weighing, packing and the like. An example is the carbon black commonly employed in the rubber and printing-ink industries.

Granulation serves to eliminate the undesirable properties of these materials, and in some cases, as for example in that of carbon black, to effect a substantial reduction in bulk, with resulting savings in cost of transport. In some cases, natural forces of adhesion can be utilized for this purpose; in other cases, as for example in some pharmaceutical preparations and mixed fertilizers, granulation must be assisted by artificial means, such as spraying with a solvent or with a solution. A number of processes and devices, frequently differing widely according to the material to be treated, have been developed for this purpose.

One of these processes, used especially for the manufacture of carbon pellets as employed in the rubber and printing-ink industries on a large scale, operates as follows: The carbon black, as industrially obtained in the form of gas black, lampblack, etc., is charged into a nearly horizontal rotary drum, whose rotation induces a rolling and sliding motion of the material along the rising side of the drum wall. Owing to the adhesive forces of the material itself, due to the hydrocarbons clinging to it as well as to electrical forces, this landslide effect agglomerates the particles into small aggregates or carbon "pellets" having no appreciable further tendency to external adhesion. In the same way, this process may also be applied to the agglomeration of other finely divided materials.

It has now been found that in practising the process described, a number of difficulties may be encountered. Thus e. g. the conveyor effect of a smooth drum wall on the charge is frequently insufficient to produce the desired landslide action. Walls have therefore been lined for example with wire screening, and while this has produced the desired result, other disadvantages have arisen, The same adhesive forces that accomplish the granulation likewise cause a fairly solid fuzz to be deposited on the screen, and as this gradually thickens, it interferes with the continuing process of granulation. For its removal, the drum must be either cleaned out by hand or else knocked out from the outside, with resulting unavoidable damage to the drum itself and to the screen lining.

All of these disadvantages are surmounted by employing apparatus constructed in accordance with the present invention, in which the drum is lined after the fashion of Venetian blinds with a plurality of rods of steel or other suitable material, movably mounted parallel to the wall of the drum in axial direction by means of bearings of suitable form. These bearings comprise slit-like openings for the rods, affording them a certain freedom of movement. The fundamental idea of the invention is that in the course of the rotary motion of the drum, the rods in the lower half of the latter lie closely adjacent to the wall of the drum, thus assisting the conveyance of the material. Above a certain level in the drum, however, the rods drop away from the wall and move in their bearings towards the interior of the drum, thus at the same time preventing any deposit of fuzz on the wall. Thus the rotary motion of the drum produces a reciprocating motion of the suspended rods.

Surprisingly, it has been found that the procedure according to the invention in no way interferes with the landslide effect responsible for the granulation; it might have been supposed that the movement of the rods, arranged after the fashion of Venetian blinds, would introduce some instability into the process, with resulting highly irregular gradation of the granulated material. On the contrary, it has been found that very uniform granules are obtained, while the reciprocating motion of the rods serves to keep the drum wall clear, so that the device according to the invention permits manufacture of carbon pellets in continuous uninterrupted operation without danger of functional failure.

By way of further development of the idea of the invention, a number of variants are possible according to the intended application. For example, the guide slits in the bearings, first described as radial, may alternatively be set at any desired angle to the radius, with resulting retarded or advanced falling away of the rods from the drum wall. Again, they may be arranged parallel to the curvature of the drum or along a chord. This converts the original radial motion of the rods into a circumferential or approximately circumferential motion along the drum wall. Of course, this arrangement is expedient only in the case of comparatively soft non-caking materials such as carbon black. It is also possible to include several rods, for example 3 to 5, in a single guide slit, with correspondingly increased clearance. For such materials, the amplitude of the reciprocating motion of the rods need not be great, for example 1 to 10% of the radius of the drum, depending on the size of the entire unit. On the other hand, in the case of hard and caking materials, it may frequently be desirable to provide a wide amplitude, for example 10 to 50% of the drum radius. This has the further effect of causing the rods on the downcoming side of the drum to drop on the wall with considerable impact, thus loosening and breaking up any accretion by concussion. Finally, the guide slits for the rods may be curvilinear, thus in many cases permitting special effects to be obtained through the resulting decelerations or accelerations.

Further, the rods, originally described as circular in cross-section, may be of any other shape, for example hexagonal, square, triangular, etc. so as to produce supplementary effects such as a cutting action upon hard crusts.

The bearings may be constructed according to various forms of embodiment. They may, for example, comprise single rounds or bars bent into the required shape and attached to the inside of the drum wall at the required intervals by welding. According to another embodiment, a ring of sheet metal may be provided inside the drum near each end, in which the guide slits have first been produced by punching or otherwise.

The design of a device according to the invention depends on the application and the absolute size of the entire unit. For example, in the processing of soft non-caking materials, the rods may be comparatively light. On the other hand, when a drum of small diameter is used, for example for the processing of pharmaceutical preparations, they must be comparatively heavier relative to the drum, since in that case the available drop will be less.

Figure 2:
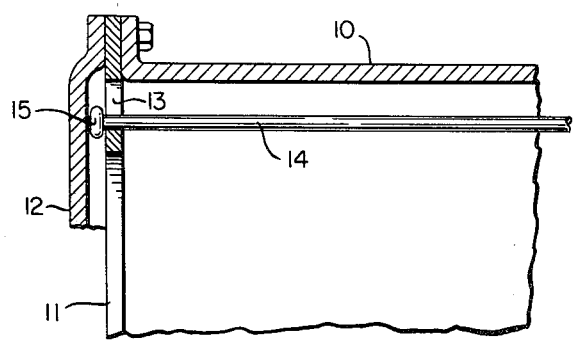

These and other features of the invention will be best understood and appreciated by reference to the accompanying drawings, in which:

Fig. 1 is a view in perspective of a drum embodying the invention, with portions shown as broken away, Fig. 2 is a fragmentary view in longitudinal section, and Figs. 3–8 are fragmentary views showing different constructions for movably retaining the rods in the drum.

In Figs. 1 and 2 the drum 10 is shown as flanged at its end so that a flat annular ring 11 and a head 12 may be conveniently bolted to it. The ring is provided with radial slots 13 for the reception of rods 14 having enlarged heads 15, the rods being freely slidable in the slots and the slots being shaped to permit the rods to fall into contact with the inner surface of the drum when rotated in approaching their lowermost position in the drum.

Figure 3:
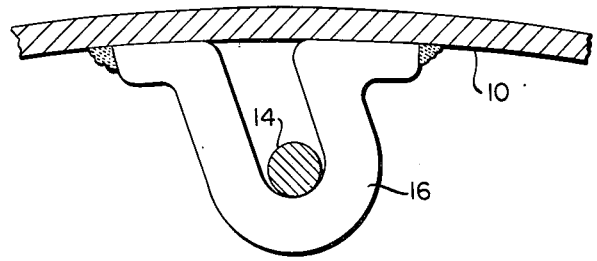
Figure 4:
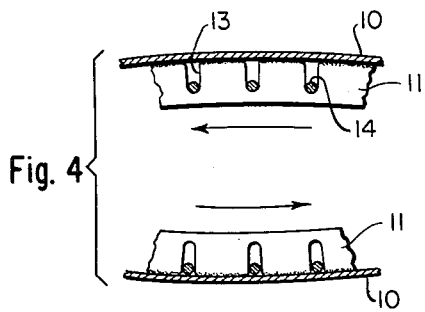

Fig. 3 shows a rod connection comprising a single round bar bent to form a guideway that is slightly inclined from a radial direction. Fig. 4 is a fragmentary sectional view of the construction shown in Figs. 1 and 2 as seen looking outwardly toward one end.

Figure 5:
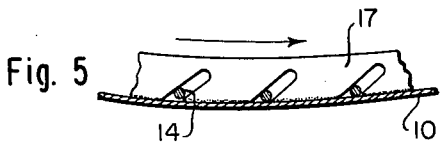
Figure 6:
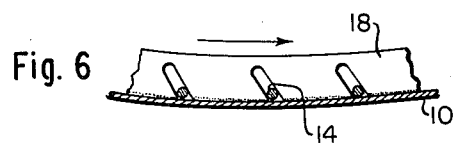

In Fig. 5 an annular ring 17 is shown as having slots inclined forwardly with reference to the radius of the drum, and in Fig. 6 a similar ring 18 is provided with slots inclined rearwardly with reference to the radius and direction of rotation.

Figure 7:
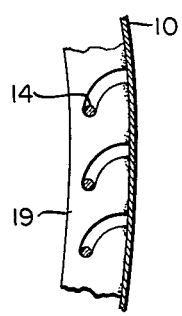
Figure 8:
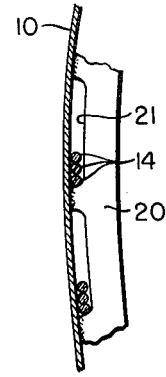

In Fig. 7 the slots in the retaining ring are shown as curved, and in Fig. 8 the ring 20 has circumferential slots 21 each containing a group of three of the rods 14.

The device according to the invention is susceptible of extensive application in all granulating processes where granulation may be effected by the landslide effect described; in addition to the aforementioned applications to the manufacture of carbon black, granulated mixed fertilizer, and pharmaceutical preparations, it may also be employed in the manufacture of granulates from finely divided silica or other white fillers, or from activated carbon for filtration purposes; or of other filtering materials.

Having thus disclosed my invention and described in detail a preferred embodiment thereof, I claim as new and desire to secure by United States Letters Patent:

1. Apparatus for agglomerating finely-divided materials comprising a cylindrical drum adapted for rotation about a substantially horizontal axis and having a plurality of slotted bearings secured thereto around each end adjacent its internal wall and spaced circumferentially from each other, and rods mounted in said bearing slots and extending through the drum parallel to the side wall thereof, being held against contact with each other by the said spaced bearings.

2. The apparatus of claim 1 in which the bearing slots are directed radially of the drum.

3. The apparatus as described in claim 1 in which the bearing slots are directed at an angle to the radius of the drum.

4. The apparatus as described in claim 1 in which the bearing slots are curved.

5. The apparatus as described in claim 1 in which at least one end of the bearing slot lies in the plane of the inner wall of the drum.

6. The apparatus as described in claim 1 in which the rods are polygonal in cross section.

7. Apparatus for pelletizing carbon black and similar finely divided materials without substantial attrition comprising a horizontally-disposed cylindrical drum having slotted bearings disposed around its internal periphery at each end and spaced apart circumferentially, and rods retained therein and extending through the drum parallel to its side wall, said slotted bearings being so arranged that upon rotation of the drum the rods below the approximate horizontal diameter of the drum will lie closely adjacent the wall thereof and assist in conveying the material upwardly with the drum and those above said diameter will lie spaced from said wall and will drop on the downcoming side of the drum with impact whereby material sticking to the wall of the drum will be dislodged therefrom.

References Cited in the file of this patent

UNITED STATES PATENTS

| | | |
|---|---|---|
| 1,449,751 | Hardinge | Mar. 27, 1923 |
| 1,724,441 | Weir | Aug. 13, 1929 |
| 2,012,602 | Forrester | Aug. 27, 1935 |
| 2,013,179 | Gerasch | Sept. 3, 1935 |

FOREIGN PATENTS

| | | |
|---|---|---|
| 574,213 | Germany | Apr. 10, 1933 |